April 7, 1931. H. I. WILBER 1,799,663
MECHANICAL MOVEMENT
Filed Aug. 14, 1926 4 Sheets-Sheet 2

INVENTOR
Herbert I. Wilber
BY
ATTORNEY

April 7, 1931.  H. I. WILBER  1,799,663
MECHANICAL MOVEMENT
Filed Aug. 14, 1926  4 Sheets-Sheet 3

INVENTOR
HERBERT I. WILBER
O. Ellen Edwards
ATTORNEY

Patented Apr. 7, 1931

1,799,663

UNITED STATES PATENT OFFICE

HERBERT I. WILBER, OF NEW YORK, N. Y.

MECHANICAL MOVEMENT

Application filed August 14, 1926. Serial No. 129,162.

The object of my invention is to provide a gearless mechanical movement for transmitting angular movement from one shaft to another, the two shafts having a common axis, and allow for either a direct drive or the driven shaft to be driven in either direction at any velocity from zero up to substantially the angular velocity of the driving shaft. This invention is particularly applicable to automobiles, but may be used in any desired environment. This object is accomplished by my invention, one embodiment of which is hereinafter more particularly set forth.

For a more detailed description of my invention, reference is to be had to the accompanying drawings, forming a part hereof, in which.

Throughout the various views of the drawings, similar reference characters designate similar parts.

My improved mechanical movement has a driving shaft 1 and a driven shaft 2 and connecting these is my improved mechanical movement 3 which will now be described.

This movement 3 is mounted in any suitable casing 4 which is preferably composed of a bottom 5 and forward top portion 6 and a rear top portion 7 and this casing is divided into as many parts as convenient so as to properly house and support the movement.

The shaft 1 has a bar 8 connected thereto and this bar 8 runs laterally over a limited distance and carries rollers 9 which are mounted on the bar 8 with fixed pivots and these rollers 9 engage the flanges 10 which extend from a plate 11 which is fixed to a stud shaft, not shown. The bar 8 also carries anti-friction rollers 12 in addition to the rollers 9 and these rollers press against the plate 11 so as to enable the parts 8 and 11 to move freely one with regard to the other, without lost motion and according to the design of the mechanism, as will appear below. The elements 8 to 12 inclusive are repeated three times, making four such elements all told, the first one being designated by the character 13, the next by the character 14, the third by the character 15 and the last by the character 16. The one 13 is connected to 14 by a stud shaft, not shown, and these two are at right angles to each other, the part 11 of the combination 13 being secured to another part 11 of the combination 14, the flanges 10 standing in opposite directions, as shown. The bars 8 of the combinations 14 and 15 are connected by a stud shaft 17 which is supported by means described below. The parts 11 of the combinations 16 and 15 are connected by a stud shaft, not shown, and are at right angles to each other. The parts 14 and 15 are also held at right angles, as indicated. From the bar 8 of the combination 16 extends a stud shaft 18 which drives the mechanism hereinafter described.

The stud shaft between the combinations 13 and 14 is surrounded by two bearings 19 and 20 and the bearing 19 is connected to a link 21 which runs to a crank 22 with which it is pivotally connected at 23. This crank 22 is fixed to a shaft 24 which is journaled in suitable bearings 25 extending inwardly from the parts 6 and 7 of the casing 3. In a corresponding manner, the bearing 20 forms a part of the link 26 which is connected to a crank 27 by means of a suitable pivot 28 and the crank 27 is fixedly mounted on a shaft 29 which is suitably journaled in bearings 25 mounted, as above described.

In a similar manner, the stud shaft, which is not shown but which connects the combinations 15 and 16 also carries two bearings 30 and 31, the bearing 30 is a part of a link 32 which is connected to a crank 33 by means of a suitable pivot 34 and the crank 33 is fixedly mounted on a hollow shaft 35 which is journaled on the shaft 24 and runs from one bearing 25 to the other. In a similar manner, the bearing 31 forms a part of a link 36 which is pivotally connected to a crank 37 by means of a suitable pivot 38 and the crank 37 is fixedly connected to a hollow shaft 39 which runs from one bearing 25 to the other and is journaled on the shaft 29.

Other cranks are connected to the shafts 24, 29, 35 and 39, as will appear below.

The stud shaft 17 which connects the elements 14 and 15 has twin bearings 40 mounted thereon and these bearings form parts of links 41 which at their other ends are fixedly connected to a shaft 42 which has its ends journaled in suitable bearings 43 in the casing 6 and this shaft also carries a suitable segmental worm gear 44 which is fixedly mounted thereon and meshes with a worm 45 fixedly mounted on a shaft 46 which turns in suitable bearings 47 on a crossing 48 which extends from one side of the part 4 of the casing 3 to the other. The shaft 46 also carries a pinion 49 which is fixedly mounted thereon and meshes with a segmental gear 50 on a stud shaft 51 which runs parallel to the shaft 47 and which is mounted in a suitable bearing 52 in the part 6. The stud shaft 51 has a pedal 53 fixedly mounted thereon and this pedal is normally kept at its rearmost position by a coil spring 54 which is connected at one end to the part 7 and at the other end to the foot pedal 53. In view of the foregoing, it is obvious that by pressing the foot pedal 53, it is possible to shift the segmental gear 56 and this drives the pinion 49 which will cause the shaft 46 to revolve and this in turn drives the worm 45 to which the worm gear 44 is connected and the worm gear 44 drives the shaft 42 so as to cause it to turn about its axis and by so turning the twin arms 41 are correspondingly shifted so as to throw the shaft 17 so that it ceases to be in alignment with the shafts 1 and 2 and is placed to one side thereof, the amount to which it is thrown to one side will depend upon the movement of the foot pedal 53. The purpose of this will appear below.

The crossing 48 carries a bearing 55 on its under side in which the stud shaft 18 is journaled. This stud shaft 18 is extended beyond the bearing 55 and carries the outer casing 56 of a clutch 57 which casing is slidably mounted thereon and the extreme end of this stud shaft 18 is reduced to 58 to carry a member 59 of the inner part of the clutch which is adapted to engage the outer part 56. The part 56 is slidably mounted on the stud shaft 18, but is so arranged and disposed that it has no angular movement relative to this stud shaft. The part 59, however, may have an angular movement with regard to such shaft and does in fact have the same when the clutch 57 is released. The mechanism for shifting the outer member 56 of the clutch 57 will now be described.

Figure 1:
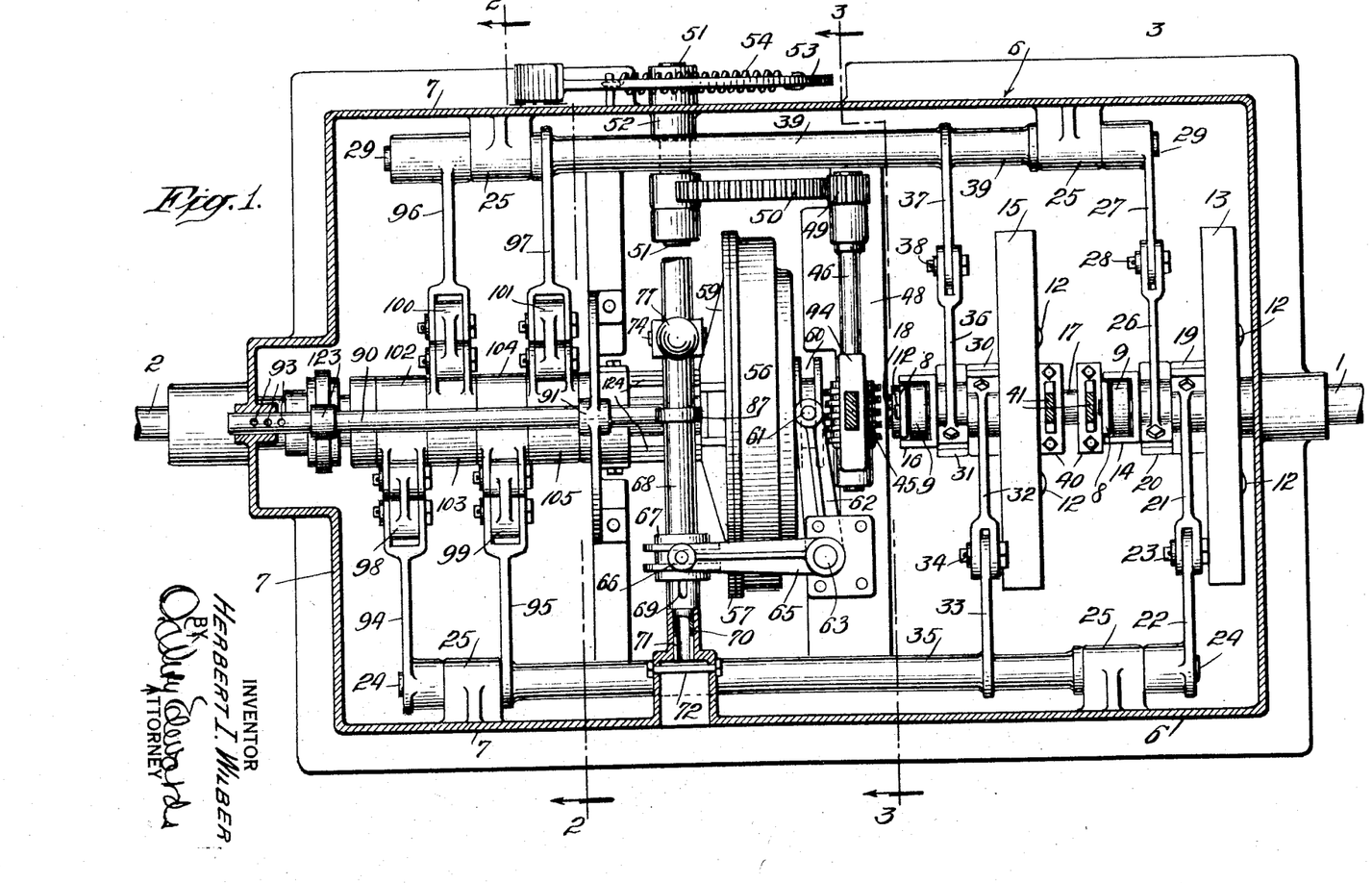
Figure 1 is a plan view of my improved mechanical movement, with parts removed to reveal the structure.
Figure 2:
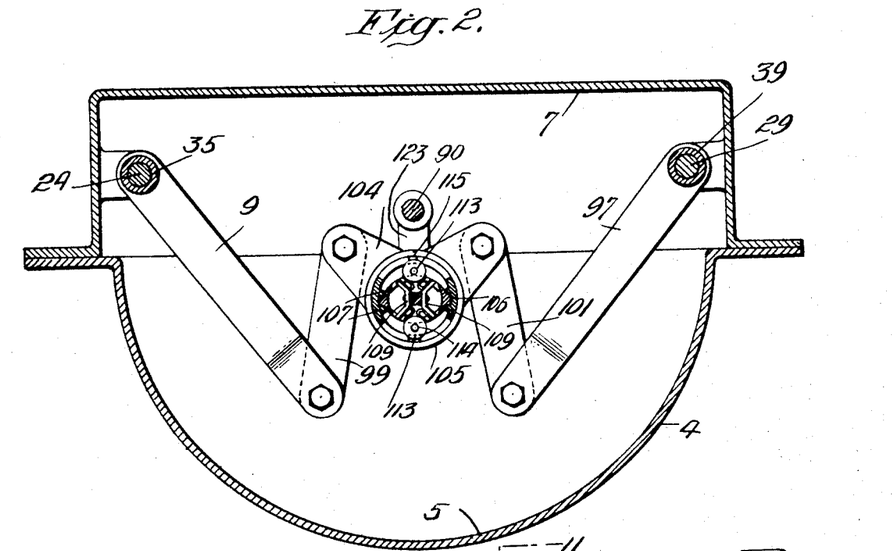
Figures 2 and 3 are sectional views, taken on the lines 2—2 and 3—3, respectively, of Figure 1, looking in the direction of the arrows.

The part 56 has a grooved hub 60 which is engaged by corresponding pins 61 on a fork 62 which is fixedly mounted on an upright stud shaft 63 which turns in suitable bearings 64 and the upper end of this stud shaft 63 is provided with a second fork 65 which has inwardly projecting pins 66 which enter a corresponding groove in a collar 67 slidably mounted on a shaft 68. The collar 67 is mounted with a pin and slot connection to the shaft 68 so that it partakes of the angular movements of the same and can slide freely thereon. The slot 69 of this pin and slot connection is shown in Figure 1. The purpose of this is to let the collar 67 turn freely, as far as the pins 66 are concerned, and without shifting said pins, but if the shaft 70, which is described below and which is within the shaft 68, be shifted in the direction of its length, that is the direction of the axis of the shafts 68 and 70, the collar 67 will be correspondingly moved on the shaft 68 and by this movement shift the arm 65 which will shift the stud shaft 63 and this, in turn, will shift the arm 62 and shift the clutch outer member 56 so as to fix the clutch on the stud shaft 18 by a mechanism described below. The shaft 68 rests against suitable bearings 71 which extend inwardly from the cover 7 and one of these bearings is provided with a bolt 72 which is adapted to enter a corresponding slot in the shaft 70 which is journaled in these bearings 71 so that when the slotted end of the shaft 70 is shifted so as to engage the bolt 42 there can be no angular movement of either the shaft 68 or the shaft 70. When the shaft 70 is free of the bolt 72, these shafts may turn together on their common axis and function, as set forth below. Mechanism will now be described for shifting these shafts about its axis or shifting the shaft 70 so that it will engage the bolt 72.

Figure 3:
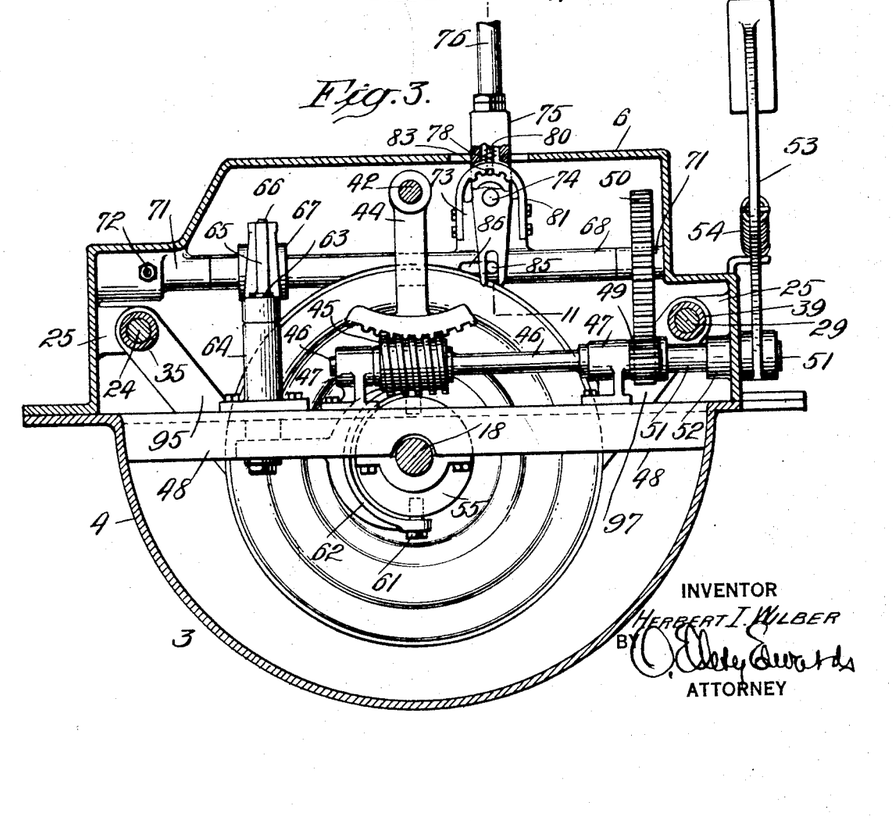

At a convenient location, rising from the shaft 68, and preferably integral therewith, is a pedestal 73 which has a pivot 74 extending therefrom and on this pivot is fulcrumed a lever 75. This lever has an upper hollow portion 76 surmounted by a cap 77 which is fixed to a rod 78 which carries a collar 79 beneath which is a coil spring 80 that rests on a segment 81 fixed to the upper surface of the pedestal 73. Below the segment 81 and forming a part thereof, are three gear teeth 82 adapted to be engaged by projections 83 on the bottom of the rod 78, the parts being so arranged and disposed that by depressing the cap 77 the projection 83 may be free from the teeth 82 against which they are normally held by the spring 80. When so shifted, the lever 75 may be turned on its fulcrum 74. The lower ends 84 of the lever 75 are connected by a pin 85 that passes through corresponding slots in the shafts 68 and 70. The slot in the shaft 68 is elongated, as shown at 86, so as to permit this lever to be shifted without moving said shaft, when this lever turns on its fulcrum 74. When it does so turn, acting through the pin 85, it shifts the shaft 70 in the direction of its length, as above described, and this in turn shifts the collar 67 and its connected parts. When this shifting occurs, the shaft 68 and its pedestal can have no angular movement about the axis of the shaft 68 because of the bolt 72 which has been described above. When, however, the parts are in the position shown in Figure 3, the lever 75 may be shifted about the axis of the shaft 68 and when so shifted it will turn its shaft and this shaft has fixedly connected thereto a crank arm 87 which has a fork 88 at its lower end which engages a pin 89 on a longitudinal shaft 90 which moves in suitable bearings 91 in the cover 7 of the casing 3. One bearing 91, and preferably the rear bearing, has a spring pressed pawl 92 adapted to enter a corresponding recess 93 on the upper edge of this shaft 90 so as to hold this shaft 90 in any of three positions, a mid position, a forward position and a rear position, as desired, so that the lever 75 and its connected parts will stay in the position set by the operator who controls the apparatus. This shaft also carries mechanism which will be described below for controlling the pawls and ratchets through which the shaft 2 may be driven.

Returning to the shafts 24, 35, 29 and 39, it is apparent from what has been said that they are driven by their respective links 21, 32, 26 and 36 through their respective crank arms 22, 33, 27 and 37 so as to have a limited oscillating angular movement. This movement is transmitted as follows. From the crank arm 22 to the shaft 24 and thence to another crank arm 94 fixedly mounted thereon. From the crank arm 33 to the hollow crank shaft 35 and thence to the crank 95 fixedly mounted thereon. From the crank 27 to the shaft 29 and thence to a crank arm 96 fixedly mounted thereon. From the crank 37 to the crank shaft 39 and thence to the arm 97 fixedly mounted thereon. From the foregoing, it is apparent that the arms 94, 95, 96 and 97 have the same angular movement as their respective shafts. These arms are pivotally connected to corresponding links 98, 99, 100 and 101, respectively, and these links are connected to ears on sleeves 102, 103, 104 and 105, respectively, and it is apparent that these sleeves will oscillate in accordance with the movement imparted to them by their respective crank arms and connections which have been described above. As these sleeves 102 to 105 inclusive, and their contained parts, are all identical, a description of one will answer for all.

Figures 4, 5, 6, 7:
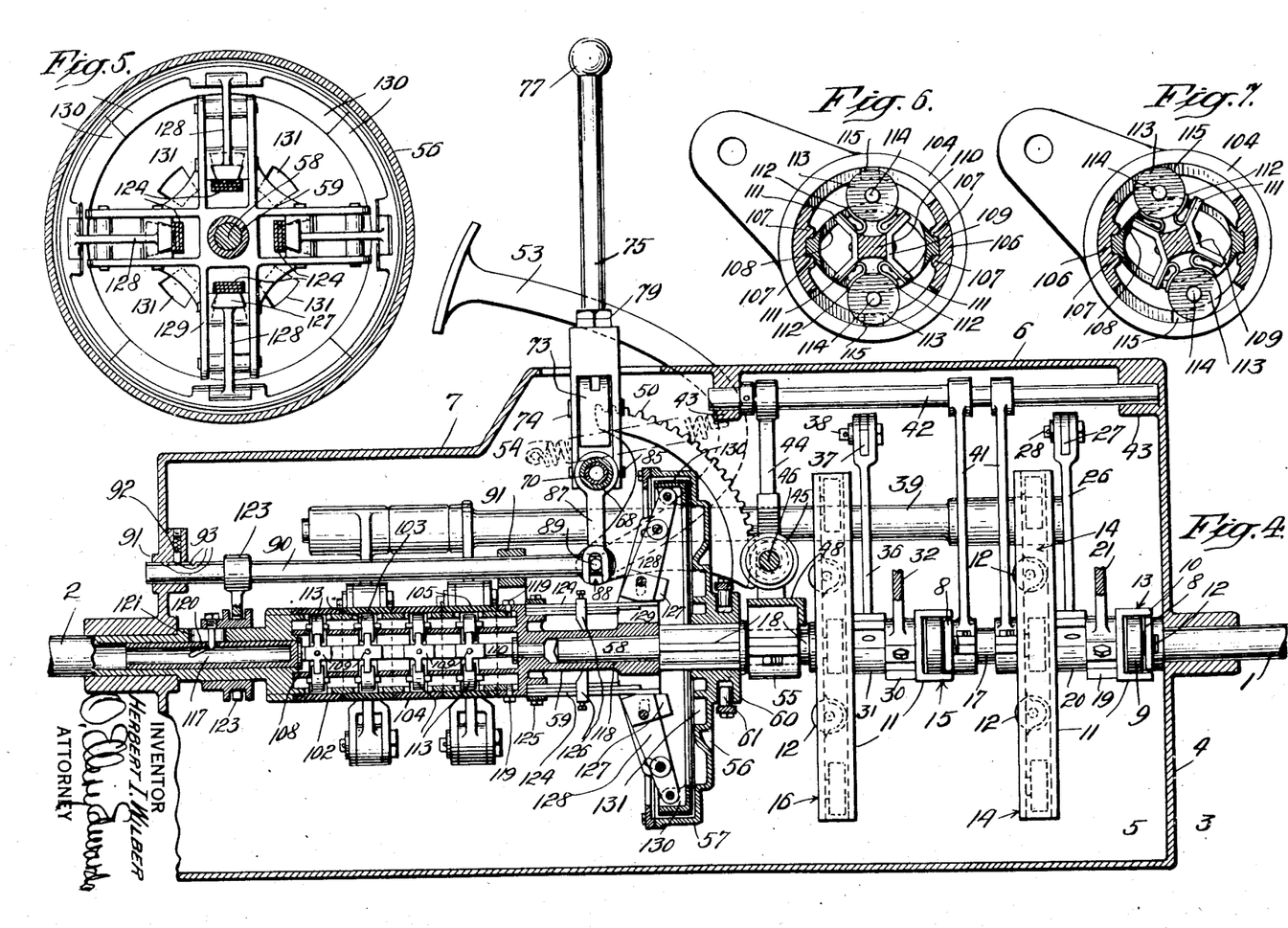
Figure 4 is a longitudinal section of the structure shown in Figure 1.
Figure 5 is a sectional view showing a portion of clutch.
Figures 6 and 7 are enlarged sectional views of the ratchet mechanism, Figure 6 showing the ratchet in its neutral position and Figure 7 in a position suitable for a forward drive.
Figures 8, 9, 10, 11:
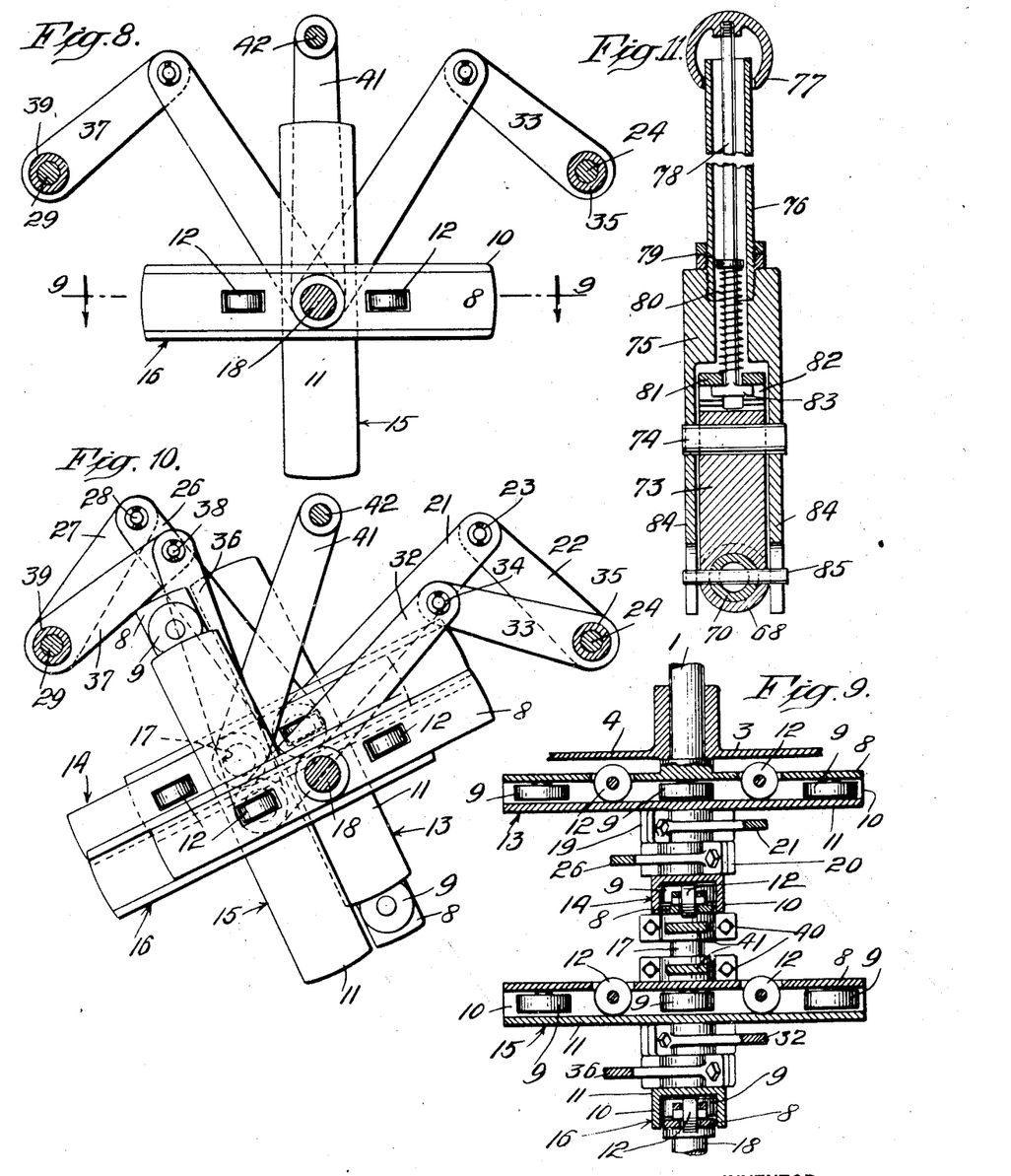
Figure 8 is a sectional view showing a portion of the shifting mechanism.
Figure 9 is another section of the same parts taken on the line 9—9 of Figure 8, looking in the direction of the arrows.
Figure 10 is a section similar to Figure 8, but with the parts in a different position.
Figure 11 is a sectional view, taken on the line 11—11 of Figure 3.

The interior of each sleeve is cylindrical and turns freely on an interior cylinder 106 in either direction. The cylinder 106 is hollow and contains two pairs of inwardly extending lugs 107 which hold a spacer 108 between them. The spacer 108 is made elliptical in cross section with projecting bars which enter between the projections 107 and it is recessed at suitable intervals opposite roller bearing blocks 109. Each block 109 is composed of a center 110 to which radial arms 111 are attached and each radial arm carries a leaf spring 112 which is bent back upon itself, as shown in Figures 6 and 7 to carry suitable rollers 113. These rollers 113 are normally pressed by these springs with a light contact against the interior of their respective sleeves when the pawl and ratchet connection is driving, as will appear below. Each roller 113 has a suitable trunnion 114 which is adapted to rest on the elliptical periphery of the spacer 108. When the parts are, as shown in Figure 6, they are in their neutral position and at that time the sleeve 104 may turn either way and the rollers 113 will simply turn idle on their springs 112. When, however, the center blocks 109 are given an angular movement one way or the other with regard to the spacer 108, the trunnions 114 will ride away from the center, on the elliptical surface of the spacer, and thereby force the peripheries of the rollers into intimate contact with the interior of the sleeve in which the rollers are mounted, say the sleeve 104, as shown in Figure 7, and thereby cause the same to bind when the ear is thrown to the left, that is anti-clockwise when looking at Figure 7. However, when the ear is thrown to the right, the pressure on the roller 113 is eased and then the sleeve 104 may be turned freely. As soon, however, as the sleeve 104 is reversed in its movement so as to again be anti-clockwise, the binding above described takes place.

If the block 110 were shifted in the opposite way from that shown in Figure 7, the binding action would be reversed, as is obvious. From this, it is apparent that with a single set of rollers and a single sleeve, a pawl and ratchet connection is here disclosed which will work in either direction with equal facility.

In order that the parts above described may be properly assembled and function, it is desirable that certain constructual details be followed. It is essential that the center 110 should be continuous and desirable that the arms 111 be riveted thereto, as shown, and that opposite the mid portions of the rollers 113 slots 115 should be provided through which the trunnions 114 may be passed. These rollers are inserted after the other parts are in place. These slots are in the cylinder 106, as are also the transverse slots through which the rollers 113 project. These sleeves 102 to 105 inclusive are placed on the cylinder 106 and held there by a suitable removable sleeve 116 at the rear end of the enlarged part, as shown in Figure 4. This cylinder 106 is the enlarged forward end of the hollow driven shaft 2, as shown in this figure, and inside of this is another hollow shaft 117 which is fixedly connected to the center 110. The forward end of this shaft rests in the enlarged rear end of a small stud shaft 118 which is pivotally mounted on the exterior of the reduced end 58 of the stud shaft 18 and the shafts 2 and 118 are normally held in fixed relation by means of suitable cap screws 119, or in any other suitable devices. The forward end of the center 110 is also journaled in this shaft 118, as shown in Figure 4.

The means for shifting the center 110 so as to make a corresponding action of the pawl and ratchets will now be described. The shaft 117 is slotted at 120 with a cam slot and this is engaged by a pin which extends through a straight, longitudinal slot 121 in the shaft 2 and into a collar 122 slidably mounted on this shaft and this collar is grooved to receive a projection 123 fixed to the shaft 90 in the conventional manner so that by shifting the shaft 90 through the lever 75, as above described, the pawl and ratchet mechanism may be placed in a neutral position, as is used for a direct drive or for a forward drive or a rear drive, as desired.

At its rear end the stud shaft 118 has fixedly held thereon a number of leaf springs 124 which may be held by means of suitable bolts 125, or any other suitable means, and these springs pass through adjustable fulcrums 126 by means of which they may be given any desired tension and at their forward ends they press against flat surfaces of suitable levers 127 and 128 which are pivotally connected to a suitable spider 129 placed on the forward end of the stud shaft 118. The spiders have suitable slots through which extend the fulcrum pins of these levers 127 and 128 and these slots are diagonally disposed, as shown in Figure 4, so that when the shaft 118 revolves about its axis and the clutch elements are not engaging so as to make the clutch operative, the parts will assume the position shown in Figure 4 and not bind. When, however, the hub 60 is shifted, as above described, these levers 127 and 128 will function, the levers 127 and 128 forcing their segments 130 into engagement with the interior of the member 56 and near its periphery and the parts or levers 127 and 128 enter a corresponding groove 131, whereby the parts of the clutch are locked together and then there is a direct drive. When this occurs, the drive of the shaft which makes the same revolve at a greater angular velocity than can be given to the shaft 2 through the pawl and ratchet mechanism, above described, so that the pawls or rollers 113 will not interfere with the functioning of the device regardless of the position of the foot pedal 53 and the parts controlled thereby. However, if the clutch 57 be released, the foot pedal 53 will control and then the pawl mechanism may be made to drive the shaft 2 in either direction in a manner which will be described below.

Operation

Assuming that the parts are connected and functioning properly, the driving shaft 1 turns the driven shaft 2 with either a straight drive, that is with exactly the same angular velocity, or through the functioning of the mechanism 3 thereby giving the shaft 2 a reduced angular velocity. The functioning of the apparatus with a straight drive will first be described and then the other operation.

For a straight drive, the operator depresses the cap 77 on the lever 75 and then throws this lever on the pivot 74 away from the collar 67. This causes the collar to be shifted in the opposite direction thereby shifting the lever 65 to correspond and this in turn acts through the pivot 63 to shift the second lever on 62 which causes the pin 61 to shift the collar 60 and force the outer member 56 of the clutch 57 into intimate and close engagement with the other member 59, whereby the clutch functions so as to bind after a little slipping. When the parts are so connected, the drive from the shaft 1 is imparted to the first combination 13 and from there through the stud shaft which is not shown, to the second combination 14 and thence through the stud shaft 17 to the combination 15 and from thence through the stud shaft, not shown, to the combination 16 and from thence to the shaft 18 and from there through the clutch 57 to the stud shaft 118 and from there power is transmitted through the screws 119 to the forward end of the shaft 2 through its enlarged portion 106, whereby the shaft 2 is driven by a direct drive from the shaft 1 and of course, has the same angular velocity.

When it is desired to run the shaft 2 at a different angular velocity from the shaft 1 and assuming the parts to be as just above described, the cap 77 is again depressed and the lever 75 shifted to its vertical position on the pivot 74, whereby the clutch is released through the reverse of the movements above described, so that the member 56 may turn at a different angular velocity from the member 59. Thereafter the foot pedal 53 is depressed and this causes a rotation of the stud shaft 51 which throws the segmental gear 50 which is rigidly connected thereto so as to rotate the pinion 49 and through this and the shaft 46, the worm 45 is driven. This rotation of the worm causes a corresponding shifting of the worm segmental gear 44 and this gives an angular movement to the shaft 42 which is transmitted through the arms 41 to the bearings 40 about the stud shaft 17. If the stud shaft 17 remains in the axis of the shaft 1 there is no shifting and under these conditions, the shaft 2 will not be driven, but this condition does not prevail after the foot pedal has been depressed, as above described, and the arms 41 shifted because the axis of the shaft 17 at once becomes eccentric to the axis of the shaft 1 and this eccentricity causes a corresponding shifting of the bars 8 which are rigidly attached to the shaft 17. This shifting of these parts causes a corresponding shifting of the stud shafts which connect the combinations 13 and 14 on the one hand and 15 and 16 on the other so that the axes of these shafts move in cylindrical surfaces having one position in alignment with the axis of the shaft 17 and one in alignment of the shaft 1 and these axes generate to such cylinders for each revolution of the shaft 1. The diameter of these cylinders will vary with the shifting of the arms 41 and the larger this diameter, the larger is the throw of the links 21, 26, 32 and 36 and that means the greater will be the throw of the parts connected therewith, or in other words, the greater will be the throw of the sleeves of the pawl and ratchet connection. The greater the throw of these sleeves, the greater the angular velocity of the shaft 2 which may be anything from zero up to maximum. Furthermore, this operation may take place either forward or reverse because the matter of reversing is governed by the shifting of the lever 75 on the axis of the shafts 68 and 70, as above set forth.

From the foregoing, it is apparent that the lever 75 and the foot pedal 53 enable the operator to have a direct drive forward or a reduced angular movement of the shaft 2, as compared with the shaft 1, on a forward drive, at his option, or if he wishes, he may drive the shaft 2 in the reverse angular movement from the shaft 1 at any desired drive from zero to maximum, within the capacity of the apparatus.

From the foregoing, it is also apparent that if the drive herein disclosed be put in an automobile and such a car when going uphill on reduced speed, if the operator should stop the car it would not be necessary to apply the brakes to prevent backing down hill because any attempt of the shaft 2 to drive the mechanism will be stopped by the action of the pawl and ratchet mechanism which will bind, and furthermore the car can be immediately started from a stop by pressing the foot pedal 53. This is often of great help in going uphill and it can be started at a very slow speed by a very slight depression, as pointed out above.

While I have shown and described one embodiment of my invention, it is obvious that it is not restricted thereto, but that it is broad enough to cover all structures that come within the scope of the annexed claims.

Having thus described my invention, what I claim is:

1. A variable speed power transmission having, in combination a driving shaft, a driven shaft in alinement with said driving shaft, three stud shafts between said driving shaft and driven shaft, a transverse bar upon said driving shaft, rollers mounted upon said bar, a transverse bar upon one end of one of said stud shafts, flanges upon said last mentioned bar cooperating with said rollers, a second flanged transverse bar upon the other end of said stud shaft at right angles to said first transverse bar thereon, a transverse bar at one end of the second stud shaft carrying rollers cooperating with said second flanged transverse bar upon said first stud shaft, a similar transverse bar upon the other end of said second stud shaft at right angles thereto, a flanged transverse bar upon one end of the third stud shaft cooperating with the rollers upon the last mentioned transverse bar, a second flanged transverse bar upon the other end of said third stud shaft at right angles to the first mentioned bar thereon, an auxiliary shaft in alinement with said driving and driven shafts, a transverse bar upon said auxiliary shaft carrying rollers cooperating with the last mentioned flanged transverse bar, cooperating clutch elements upon said auxiliary shaft and said driven shaft whereby a direct drive can be secured from said driving shaft to said driven shaft, operable means for varying the position of the axis of said second stud shaft with respect to the axis of said driving shaft thereby causing a corresponding variance in the positions of the axes of said first and third stud shafts with respect to said driving shaft, means for deriving oscillatory movements from said first and third stud shafts, means for translating said oscillatory movements into rotary movement of said driven shaft, operable means for providing either forward or reverse rotary movement of said driven shaft and means preventing translation of said oscillatory movements if said clutch elements are connected for direct drive.

2. A variable speed power transmission having, in combination a driving shaft, a driven shaft, three stud shafts between said driving shaft and driven shaft, a transverse bar upon said driving shaft, rollers mounted upon said bar, a transverse bar upon one end of one of said stud shafts, flanges upon said last mentioned bar cooperating with said rollers, a second flanged transverse bar upon the other end of said stud shaft at right angles to said first transverse bar thereon, a transverse bar at one end of the second stud shaft carrying rollers cooperating with said second flanged transverse bar upon said first stud shaft, a similar transverse bar upon the other end of said second stud shaft at right angles thereto, a flanged transverse bar upon one end of the third stud shaft cooperating with the rollers upon the last mentioned transverse bar, a second flanged transverse bar upon the other end of said third stud shaft at right angles to the first mentioned bar thereon, an auxiliary shaft in alinement with said driving and driven shafts, a transverse bar upon said auxiliary shaft carrying rollers cooperating with the last mentioned flanged transverse bar, cooperating clutch elements upon said auxiliary shaft and said driven shaft whereby a direct drive can be secured from said driving shaft to said driven shaft, operable means for varying the position of the axis of said second stud shaft with respect to the axis of said driving shaft thereby causing a corresponding variance in the positions of the axes of said first and third stud shafts with respect to said driving shaft, means for deriving oscillatory movements from said first and third stud shafts, means for translating said oscillatory movements into rotary movement of said driven shaft, operable means for providing either forward or reverse rotary movement of said driven shaft and means preventing translation of said oscillatory movements if said clutch elements are connected for direct drive.

3. A variable speed power transmission having, in combination a driving shaft, a driven shaft in alinement with said driving shaft, three stud shafts between said driving shaft and driven shaft, cooperating transverse bars carried by said stud shafts and said driving shaft, and auxiliary shaft, a transverse bar carried by said auxiliary shaft, connections between said various transverse bars allowing free displacement of the axis of one bar with relation to its cooperating bar while preventing angular displacement, cooperating clutch elements upon said auxiliary shaft and said driven shaft whereby a direct drive can be secured from said driving shaft to said driven shaft, operable means for offsetting the axes of said stud shafts with relation to said driving shaft, means for deriving oscillatory movements from some of said stud shafts, means for translating said oscillatory movements into rotary movement of said driven shaft, operable means for providing either forward or reverse rotary movement of said driven shaft and means preventing translation of said oscillatory movements if said clutch elements are connected.

4. A variable speed power transmission having, in combination a driving shaft, a driven shaft in alinement with said driving shaft, three stud shafts between said driving shaft and driven shaft, cooperating transverse bars carried by said stud shafts and said driving shaft, an auxiliary shaft, a trnsverse bar carried by said auxiliary shaft, connections between said various transverse bars allowing free displacement of the axis of one bar with relation to its cooperating bar while preventing angular displacement, cooperating clutch elements upon said auxiliary shaft and said driven shaft whereby a direct drive can be secured from said driving shaft to said driven shaft, operable means for offsetting the axes of said stud shafts with relation to said driving shaft, means for deriving oscillatory movements from some of said stud shafts and means for translating said oscillatory movements into rotary movement of said driven shaft.

5. A variable speed power transmission having, in combination a driving shaft, a driven shaft in alinement with said driving shaft, three stud shafts between said driving shaft and driven shaft, cooperating transverse bars carried by said stud shafts and said driving shaft, an auxiliary shaft, a transverse bar carried by said auxiliary shaft, connections between said various transverse bars allowing free displacement of the axis of one bar with relation to its cooperating bar while preventing angular displacement, cooperating clutch elements upon said auxiliary shaft and said driven shaft whereby a direct drive can be secured from said driving shaft to said driven shaft, operable means for offsetting the axes of said stud shafts with relation to said driving shaft, means for deriving oscillatory movements from some of said stud shafts, means for translating said oscillatory movements into rotary movement of said driven shaft and operable means for providing either forward or reverse rotary movement of said driven shaft.

6. A variable speed power transmission having, in combination a driving shaft, a driven shaft, three stud shafts between said driving shaft and driven shaft, cooperating transverse bars carried by said stud shafts and said driving shaft, an auxiliary shaft, a transverse bar carried by said auxiliary shaft, connections between said various transverse bars allowing free displacement of the axis of one bar with relation to its cooperating bar while preventing angular displacement, cooperating clutch elements upon said auxiliary shaft and said driven shaft, means for offsetting the axes of said stud shafts with relation to said driving shaft, means for deriving oscillatory movements from some of said stud shafts and means for translating said oscillatory movements into rotary movement of said driven shaft.

7. A variable speed power transmission having, in combination, a driving shaft, a driven shaft in alinement with said driving shaft, an auxilary shaft, clutch elements upon said driven shaft and said auxiliary shaft for providing direct drive from said driving shaft to said driven shaft, stud shafts between said driving and said auxiliary shafts engaging with each other and with said auxiliary and driving shafts displaceable relatively to each other and said driven shaft, operable means for causing such displacement in order to change the speed ratio and means connecting some of said stud shafts to said driven shaft in order to drive said driven shaft at such changed speed ratio.

8. A variable speed power transmission having, in combination, a driving shaft, a driven shaft, an auxiliary shaft, clutch elements upon said driven shaft and said auxiliary shaft for providing direct drive from said driving shaft to said driven shaft, stud shafts between said driving and said auxiliary shaft engaging with each other and with said auxiliary and driving shafts displaceable relatively to each other and said driven shaft, operable means for causing such displacement in order to change the speed ratio and means connecting some of said stud shafts to said driven shaft in order to drive said driven shaft at such changed speed ratio.

9. A variable speed power transmission having, in combination, a driving shaft, a driven shaft, an auxiliary shaft, clutch elements upon said driven shaft and said auxiliary shaft for providing direct drive from said driving shaft to said driven shaft, stud shafts between said driving and said auxiliary shafts engaging with each other and with said auxiliary and driving shafts displaceable relatively to each other and said driven shaft, operable means for causing such displacement in order to change the speed ratio, said operable means including an oscillatable shaft arranged parallel to said stud shafts, links connecting said oscillatable shaft with one of said stud shafts and means to impart oscillation to said oscillatable shaft, and means connecting some of said stud shafts to said driven shaft in order to drive said driven shaft at such changed speed ratio.

10. A transmission including a driving shaft, a driven shaft in alinement therewith, means for securing a direct drive between said driving and driven shafts, said means including a series of stud shafts engaging with each other and with said auxiliary and driving shafts between said driving and driven shafts which are in alinement with said shafts during direct drive, and means for displacing said stud shafts out of alinement with said driving and driven shafts for securing a different speed ratio and means connecting some of said stud shafts and said driven shaft in order to drive said driven shaft at said different speed ratio.

11. A transmission including a driving shaft, a driven shaft, means for securing a direct drive between said driving and driven shafts, said means including a series of stud shafts engaging with each other and with said auxiliary and driving shafts between said driving and driven shafts, and means for displacing said stud shafts for securing a different speed ratio and means connecting some of said stud shafts and said driven shaft in order to drive said driven shaft at said different speed ratio.

12. A transmission including a driving shaft, a driven shaft, means for directly connecting said driving and driven shafts, said means including a series of stud shafts engaging with each other and with said auxiliary and driving shafts between said driving and driven shafts, and means for displacing said stud shafts in order to secure a different speed ratio, links connected to certain of said stud shafts, a series of cranks connected to said links, shafts connected to and adapted to be oscillated by said cranks, a second series of cranks also connected to said last mentioned shafts and means connected to said last series of cranks and said driven shaft to intermittently grip and rotate said driven shaft.

13. A transmission including a driving shaft, a driven shaft adapted to be driven by said driving shaft, an auxiliary shaft having one end journalled in said driven shaft, a series of stud shafts engaging with each other and with said auxiliary and driving shafts slidably connected to said driving and auxiliary shafts, manually operated means for displacing the axes of said stud shafts to vary the speed ratio and means connecting some of said stud shafts to said driven shaft to transmit said changed speed ratio to said driven shaft.

14. A transmission including a driving shaft, a driven shaft adapted to be driven by said driving shaft, an auxiliary shaft having one end journalled in said driven shaft, a series of stud shafts engaging with each other and with said auxiliary and driving shafts slidably connected to said driving and auxiliary shafts, manually operated means for displacing the axes of said stud shafts to vary the speed ratio and means connecting some of said stud shafts to said driven shaft to transmit said changed speed ratio to said driven shaft, said transmitting means including over-lapping intermittently gripping means operating upon said driven shaft.

15. A transmission including a driving shaft, a driven shaft, an auxiliary shaft having one end journalled in said driven shaft, speed ratio changing means positioned between and connected to said auxiliary shaft and said driving shaft, clutch elements upon said auxiliary and said driven shaft for providing a portion of a direct drive between said driving and driven shafts, means for operating said clutch elements, means, including intermittently gripping means operating upon said driven shaft, connected to said speed ratio changing means for driving said driven shaft and means connected to said clutch operating means controlling said intermittently gripping means.

16. A transmission comprising a driving shaft, a driven shaft, shiftable cranks and rocking levers connected to and positively driven by said driving shaft, a series of ratchets connected to said driven shaft, means connecting said rocking levers with said ratchets, means for rendering said ratchets inoperative and a clutch also connecting the driving and driven shafts, said clutch having means for rendering it inoperative, means for causing said clutch to function with relative movement of parts of said clutch and means for interlocking the elements of said clutch for a direct drive so that there is no relative movement of parts of said clutch.

In testimony whereof, I have hereunto set my hand this 11th day of August, 1926.

HERBERT I. WILBER.